United States Patent
Ranade et al.

(10) Patent No.: US 10,339,112 B1
(45) Date of Patent: Jul. 2, 2019

(54) RESTORING DATA IN DEDUPLICATED STORAGE

(71) Applicant: Veritas Technologies LLC, Mountain View, TX (US)

(72) Inventors: Dilip Ranade, Pune (IN); Chirag Dalal, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 441 days.

(21) Appl. No.: 13/870,410

(22) Filed: Apr. 25, 2013

(51) Int. Cl.
*G06F 16/21* (2019.01)

(52) U.S. Cl.
CPC .................................. *G06F 16/21* (2019.01)

(58) Field of Classification Search
CPC ......... G06F 17/30156; G06F 17/30289; G06F 16/21
USPC .......................................................... 707/674
See application file for complete search history.

(56) References Cited

U.S. PATENT DOCUMENTS

| | | | | |
|---|---|---|---|---|
| 6,366,987 B1 * | 4/2002 | Tzelnic | ............... | G06F 11/1451 711/112 |
| 7,155,445 B1 * | 12/2006 | Kling | ................ | G06F 17/30073 |
| 7,472,242 B1 * | 12/2008 | Deshmukh | ......... | G06F 11/1451 711/162 |
| 7,539,710 B1 * | 5/2009 | Haustein | ............. | G06F 11/1453 |
| 7,567,188 B1 * | 7/2009 | Anglin | .................. | G06F 3/0608 341/63 |
| 7,761,425 B1 * | 7/2010 | Erickson | ............. | G06F 11/1464 707/649 |
| 7,831,766 B2 * | 11/2010 | Gokhale | ............... | G06F 3/0613 711/112 |
| 8,010,505 B2 * | 8/2011 | Kushwah | ............ | G06F 11/1469 707/679 |
| 8,316,057 B2 * | 11/2012 | Anglin | ................ | G06F 17/3015 707/706 |
| 8,341,367 B2 * | 12/2012 | Akirav | ................ | G06F 11/1448 707/610 |
| 8,346,730 B2 * | 1/2013 | Srinivasan | .......... | G06F 17/3015 707/664 |
| 8,346,736 B2 * | 1/2013 | Haustein | ........... | G06F 17/30315 707/692 |
| 8,370,297 B2 * | 2/2013 | Anglin | ................ | G06F 11/1453 707/610 |
| 8,407,193 B2 * | 3/2013 | Gruhl | .................... | G06F 3/0608 707/693 |
| 8,484,427 B1 * | 7/2013 | Goldobin | ................ | G06F 3/065 711/161 |
| 8,719,240 B2 * | 5/2014 | Bates | ................ | G06F 17/30156 707/692 |

(Continued)

*Primary Examiner* — Miranda Le

(74) *Attorney, Agent, or Firm* — Campbell Stephenson LLP

(57) ABSTRACT

Various systems and methods for performing a restore operation. For example, one method involves receiving information identifying a set of data objects to restore. The method also involves dividing the set of data objects into first and second subsets of data objects. After the first one of the subsets of data objects is restored from a backup computing system to a source computing system, the method involves determining whether a deduplication operation is performed on the source computing system. The method also involves delaying restoring the second subset until after the deduplication operation is performed on the source computing device.

16 Claims, 8 Drawing Sheets

(56) References Cited

U.S. PATENT DOCUMENTS

| | | | | |
|---|---|---|---|---|
| 8,732,135 B1* | 5/2014 | Gardner | G06F 11/1469 | 707/679 |
| 8,812,461 B2* | 8/2014 | Li | G06F 17/30159 | 707/692 |
| 8,849,761 B2* | 9/2014 | Prahlad | G06F 17/302 | 707/640 |
| 8,849,851 B2* | 9/2014 | Chavda | G06F 11/1453 | 707/770 |
| 8,868,507 B2* | 10/2014 | Yamagami | G06F 11/1471 | 707/648 |
| 8,904,128 B2* | 12/2014 | Lillibridge | G06F 12/00 | 707/692 |
| 8,930,306 B1* | 1/2015 | Ngo | G06F 17/30194 | 707/610 |
| 9,026,499 B1* | 5/2015 | Rajimwale | G06F 17/30893 | 707/674 |
| 9,075,754 B1* | 7/2015 | Sadhu | G06F 11/1458 | |
| 9,098,432 B1* | 8/2015 | Bachu | G06F 11/1076 | |
| 9,122,639 B2* | 9/2015 | Kennedy | G06F 11/1453 | |
| 9,298,707 B1* | 3/2016 | Zhang | G06F 17/30008 | |
| 9,307,114 B2* | 4/2016 | Hoarau | H04N 1/00196 | |
| 9,372,762 B2* | 6/2016 | Tsaur | G06F 11/1469 | |
| 9,383,936 B1* | 7/2016 | Freitas | G06F 3/0641 | |
| 9,436,558 B1* | 9/2016 | Per | G06F 11/1451 | |
| 9,448,739 B1* | 9/2016 | Nagarkar | G06F 3/0641 | |
| 9,633,022 B2* | 4/2017 | Vijayan | G06F 11/1453 | |
| 2003/0126247 A1* | 7/2003 | Strasser | G06F 11/1458 | 709/223 |
| 2008/0243769 A1* | 10/2008 | Arbour | G06F 11/1453 | |
| 2008/0244204 A1* | 10/2008 | Cremelie | G06F 11/2097 | 711/162 |
| 2010/0042790 A1* | 2/2010 | Mondal | G06F 3/0608 | 711/161 |
| 2010/0174881 A1* | 7/2010 | Anglin | G06F 11/1453 | 711/162 |
| 2011/0016095 A1* | 1/2011 | Anglin | G06F 11/1453 | 707/692 |
| 2011/0093439 A1* | 4/2011 | Guo | G06F 11/1453 | 707/679 |
| 2011/0218969 A1* | 9/2011 | Anglin | G06F 11/1453 | 707/679 |
| 2012/0011101 A1* | 1/2012 | Fang | H04L 63/12 | 707/654 |
| 2012/0017060 A1* | 1/2012 | Kapanipathi | G06F 3/0608 | 711/162 |
| 2012/0084595 A1* | 4/2012 | Dutch | G06F 11/1469 | 714/2 |
| 2012/0109907 A1* | 5/2012 | Mandagere | G06F 17/30303 | 707/692 |
| 2012/0117342 A1* | 5/2012 | Karonde | G06F 11/1451 | 711/162 |
| 2012/0137054 A1* | 5/2012 | Sadri | G06F 3/0641 | 711/103 |
| 2012/0150949 A1* | 6/2012 | Vijayan Retnamma | G06F 11/1453 | 709/203 |
| 2012/0159098 A1* | 6/2012 | Cheung | G06F 12/0261 | 711/162 |
| 2012/0233417 A1* | 9/2012 | Kalach | G06F 11/1453 | 711/162 |
| 2012/0250857 A1* | 10/2012 | Bosson | G06F 17/30489 | 380/44 |
| 2012/0295693 A1* | 11/2012 | Bytnar | G07F 17/3225 | 463/25 |
| 2012/0303590 A1* | 11/2012 | Chernow | G06F 17/30156 | 707/675 |
| 2012/0311327 A1* | 12/2012 | Liu | H04L 63/0435 | 713/167 |
| 2012/0317359 A1* | 12/2012 | Lillibridge | G06F 12/00 | 711/118 |
| 2013/0018855 A1* | 1/2013 | Eshghi | G06F 11/1453 | 707/692 |
| 2013/0246372 A1* | 9/2013 | Rao | G06F 17/30156 | 707/692 |
| 2013/0339316 A1* | 12/2013 | Hirsch | G06F 3/0641 | 707/692 |
| 2014/0172950 A1* | 6/2014 | Wang | H04L 67/1097 | 709/203 |
| 2014/0188805 A1* | 7/2014 | Vijayan | G06F 11/1453 | 707/646 |
| 2014/0195493 A1* | 7/2014 | Akirav | G06F 17/30156 | 707/692 |
| 2014/0229440 A1* | 8/2014 | Venkatesh | G06F 17/30174 | 707/634 |
| 2014/0279953 A1* | 9/2014 | Aronovich | G06F 17/30156 | 707/692 |
| 2015/0046398 A1* | 2/2015 | Camble | G06F 11/1453 | 707/634 |

* cited by examiner

| Logical ID | Segment ID | Signature | Address |
|---|---|---|---|
| F1 | 1 | 592 | 0xFD |
| F1 | 2 | 433 | 0xEB |
| F2 | 3 | 655 | 0xAD |
| F2 | 4 | 177 | 0xFA |
| F3 | 5 | 202 | 0xDD |
| F3 | 6 | 655 | 0xAD |
| F4 | 7 | 445 | 0xCE |
| F4 | 8 | 592 | 0xFD |
| F5 | 9 | 301 | 0xBD |
| F5 | 10 | 765 | 0xAF |
| F6 | 11 | 592 | 0xFD |
| F6 | 12 | 445 | 0xCE |

*FIG. 6A*

| Set | Segment ID | Signature | Address |
|---|---|---|---|
| 1 | 1 | 592 | 0xFD |
| 1 | 8 | 592 | 0xFD |
| 1 | 11 | 592 | 0xFD |
| 2 | 3 | 655 | 0xAD |
| 2 | 6 | 655 | 0xAD |
| 2 | 2 | 433 | 0xEB |
| 3 | 7 | 445 | 0xCE |
| 3 | 12 | 445 | 0xCE |
| 4 | 4 | 177 | 0xFA |
| 4 | 5 | 202 | 0xDD |
| 4 | 9 | 301 | 0xBD |
| 4 | 10 | 765 | 0xAF |

*FIG. 6B*

| Set | Logical ID | Signature | Address |
|---|---|---|---|
| 1 | F1 | 592 | 0xFD |
| 1 | F1 | 433 | 0xEB |
| 1 | F4 | 445 | 0xCE |
| 1 | F4 | 592 | 0xFD |
| 1 | F6 | 592 | 0xFD |
| 1 | F6 | 445 | 0xCE |
| 2 | F2 | 655 | 0xAD |
| 2 | F2 | 177 | 0xFA |
| 2 | F3 | 202 | 0xDD |
| 2 | F3 | 655 | 0xAD |
| 3 | F5 | 301 | 0xBD |
| 3 | F5 | 765 | 0xAF |

*FIG. 6C*

RESTORING DATA IN DEDUPLICATED STORAGE

FIELD OF THE INVENTION

This invention relates to data storage systems. More particularly, this invention relates to performing backup and restore operations in data storage systems that employ various deduplication methodologies.

DESCRIPTION OF THE RELATED ART

As computers and computer data become increasingly prevalent, the amount of data being stored tends to increase. Advances in storage technology have improved storage system capabilities. Nonetheless, given that storing more data typically requires more storage capacity, and given that storage capacity comes with a price, there is significant interest in reducing the amount of storage space used to store data.

One technique used to reduce the amount of storage space used to store a given amount of data is known as deduplication. Deduplication involves identifying duplicate data and storing a single copy of the duplicate data, rather than storing multiple copies. For example, if two identical copies of a portion of data (e.g., a file) are stored on a storage device, deduplication involves removing one of the copies and instead storing a reference to the removed copy. If access to the removed copy is requested, the request is redirected and the reference is used to access the remaining copy. Since the reference is typically relatively small, relative to the copy of the portion of data, the added space used to store the reference is more than offset by the space saved by removing the duplicate copy.

Another aspect of data storage is backing up data. This involves creating a backup copy of primary data, so that if the primary data becomes corrupted or otherwise unavailable, the backup copy can be used to restore the primary data. Typically, the primary data is stored in a primary storage device and the backup copy in a separate backup storage device. Both the primary storage device and the backup storage device can employ deduplication methodologies to reduce the amount of storage consumed by stored data.

When transferring data between a primary (source) storage device and a backup storage device, complications can arise when the two storage devices use disparate deduplication methodologies. For example, if the backup storage device does not understand the references used by the primary storage device for deduplication, the backup storage device may be unable to locate data using the references. To work around this, data is typically rehydrated before being transferred between storage devices that use different deduplication methods. However, if the primary storage device depends upon deduplication to store greater amounts of data than the primary storage device would otherwise be capable of storing, attempting to restore data that is not deduplicated, e.g., rehydrated data, from the backup storage device to the primary storage device can cause failures due to inadequate available space on the primary storage device.

BRIEF DESCRIPTION OF THE DRAWINGS

The present invention may be better understood, and its numerous objects, features and advantages made apparent to those skilled in the art by referencing the accompanying drawings.

FIG. 6A is an example of metadata describing data stored in a backup storage device, according to one embodiment.

FIG. 6B is an example of sorted metadata describing data stored in a backup storage device, according to one embodiment.

FIG. 6C is an example of sorted metadata describing data stored in a backup storage device, according to one embodiment.

Figure 1:
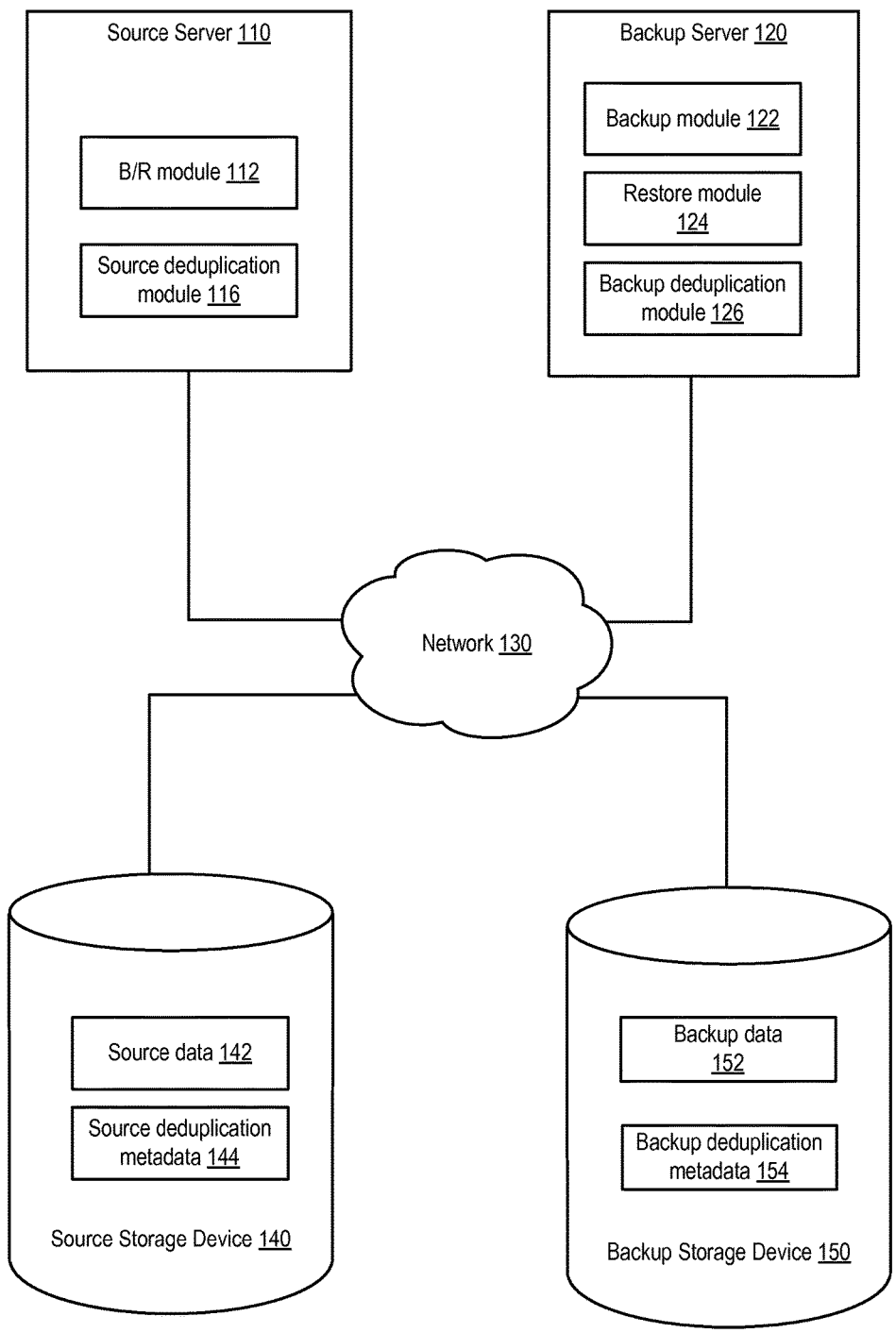
FIG. 1 is a block diagram of a system configured to restore data in a deduplication environment, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

An instruction to transfer data typically includes a number of parameters and depends on a number of factors to complete successfully. For example, parameters that are typically specified include information indicating what data is to be transferred, such as a list of file names, locations where the data is stored (source locations) and locations to which the data will be copied (destination locations). The source and destination locations can include physical address information, file or volume names, host or device names, web addresses, and the like. One factor that can cause a data transfer to fail is if insufficient space is available to store the data at a destination location. For example, if a transfer request specifies that a 20 MB file is to be copied from storage device A to storage device B, but storage device B only has 10 MB of space available, the transfer will likely fail due to insufficient space on storage device B.

This type of failure can affect the ability to restore data from a backup storage device to a source storage device. If the amount of data to be restored during a given restore operation exceeds the available space on the source storage device, the restore operation will likely fail. One way to attempt to prevent such a failure is to restore the data to a larger storage device. The data can then be manually copied from the larger storage device to the actual destination (primary storage device). Of course, this assumes that a larger storage device is available, which may not always be the case. This also tends to involve additional copy operations, which represent an increased burden on computing resources, such as transmission bandwidth.

Another option is to attempt to identify data in the backup storage device that already exists on the source storage device and exclude such data from the restore operation. In some cases it may be possible to determine whether data being restored from a backup storage device to a source storage device already exists on the source storage device and if so, avoid copying the data. One way to determine if a piece of data being restored already exists in the source storage device is to generate a fingerprint for the data and compare the fingerprint with fingerprints of the data already stored on the source storage device. If the fingerprint matches, one can conclude the data is already stored in the source storage device and avoid storing an additional copy of the data in the source storage device.

However, this depends on using the same methodology to generate the fingerprint for the data being restored as was used to generate the fingerprints for the data already stored in the source storage device. In some cases, the methodology used to generate the fingerprints for the data stored in the source storage device is unknown, or is unavailable to a backup storage device that is restoring data to the source storage device. For example, if a first hash algorithm is used to generate fingerprints for the data stored in the source storage device, but the hash algorithm is different than the fingerprint mechanism of the restoring (backup) storage device, the fingerprint for the data being restored will not match any fingerprints for data already stored in the source storage device. Thus, if the backup storage device does not use the same deduplication methodology as was used on the source storage device, the backup storage device is unable to determine whether a given segment of data that is being restored is already stored in the source storage device. If the backup storage device is unable to determine whether data being restored is already stored in the source storage device, the backup storage device will restore all data specified in the restore request. As noted above, this can cause the restore operation to fail due to insufficient available space on the source storage device.

When restoring data into a source storage device that employs deduplication, some alternative is desired for when there is not enough space on the source storage device to store all of the data being restored. In some circumstances, it is impossible or prohibitively inefficient to utilize existing mechanisms. FIG. 1 shows a system configured to perform backup and restore operations between storage devices, where at least one of the storage devices includes a deduplicated storage device. The system shown in FIG. 1 is configured to segregate the data prior to transferring the data to a deduplicated storage device, and to perform restore operations in stages such that the restore operations do not fail due to inadequate available storage space. Each stage can include, for example, transferring a subset of the segregated data from a backup storage device to a source storage device and initiating a deduplication operation on the source storage device.

As shown, FIG. 1 includes a source server 110 connected to a backup server 120 by a network 130. Network 130 can include a WAN (Wide Area Network), such as the Internet, one or more LANs (Local Area Networks), and/or one or more SANs (Storage Area Networks). Also shown are source storage device 140 and backup storage device 150.

Source server 110 is implemented as a computing device such as a personal computer, laptop computer, server, personal digital assistant, cell phone, and the like. Source server 110 can include one or more mail servers, web servers, file servers, document repositories, database servers, and the like. Source server 110 can also include one or more applications, not shown, such as word processing programs, email programs, graphic editing programs, database applications, or the like. Source server 110 is configured to access data, such as source data 142. Accessing source data 142 can include performing input/output (I/O) operations such as, for example, writing to and/or reading from, source data 142. The I/O operations can be performed in response to a request by one or more clients (not shown) that are connected to source server 110.

As shown, source server 110 is coupled to source storage device 140. Source storage device 140 provides persistent data storage, such that data stored on source storage device 140 will remain stored even after the storage device is powered off. Source storage device 140 can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Source storage device 140 can also be a virtual or logical storage device that is implemented on such physical storage devices and/or storage systems. For example, source storage device 140 can be a logical volume that is implemented on a RAID storage system. Additionally, source storage device 140 can include one or more storage devices. Source storage device 140 can also include one or more types of storage media, including solid state media (e.g., flash drives), optical media (e.g., CDs and DVDs), and magnetic media (e.g., hard disks or magnetic tape). In some embodiments, source storage device 140 can be implemented using cloud storage, in which the storage device is a logical storage device to which physical storage device(s) are allocated on an as-needed and/or as-contracted basis.

As shown, source storage device 140 includes source data 142 and source deduplication metadata 144. Source data 142 can include data that is accessible by source server 110, such as application data, word processing files, media files, database files, and the like. Metadata can also be included within source data 142, such as file system information identifying which blocks of source data 142 store what data, access times, permissions, and the like. Source data 142 can also include references to data, using a mechanism such as pointers.

Source deduplication metadata 144 can include information identifying deduplicated data segments. In one embodiment, source deduplication metadata 144 can be implemented as a database. Source deduplication metadata 144 includes a list of signatures of data segments stored in source data 144, as well as reference counts indicating how many times each segment is shared, e.g., how many files include copies of a given segment.

In one embodiment, source server 110 is also configured to perform backup and restore operations that backup and/or restore source data 142. Source server 110 includes a backup and restore (B/R) module 112. B/R module 112 is configured to create backups of data, such as a portion or all of source data 142. In one embodiment, B/R module 112 is configured to automatically create backups in response to detecting the occurrence of some event. For example, B/R module 112 can automatically create a backup of data included in source data 142 in response to detecting the expiration of a time period. B/R module 112 is also configured to manually create backups, for example, in response to detecting user input specifying that a backup should be created. Creating a backup involves copying data, such as source data 142 from storage, such as source storage device 140 to backup storage, such as backup storage device 150. B/R module 112 is configured to perform backup operations at a logical, or file, level, e.g., by specifying one or more file names, volume names, and/or directory names that are to be backed up. B/R module 112 is also configured to perform backup operations at a physical, or block, level, e.g., by specifying one or more physical address and/or ranges of physical addresses from which data is to be backed up.

In one embodiment, source storage device 140 is implemented as a deduplicated data store. In this case, creating a backup can involve source server 110 rehydrating the data that is being backed up prior to copying the data to backup storage 150. Rehydration of deduplicated data involves creating multiple copies of a single copy stored in source storage device 140.

B/R module 112 is also configured to restore data to source data 142, for example by restoring data from backup data 152 in backup storage device 150 to source data 142. In one embodiment, restoring data is performed in response to detecting that source data 142 has become unavailable or corrupted. Data can become unavailable and or corrupted, for example in response to user error or system, software and/or hardware failure. B/R module 112 is configured to automatically initiate and complete a restore operation in response to detecting the occurrence of an event, such as a failure or a storage device coming online. In one embodiment, B/R module 112 initiates a restore operation in response to user input.

Source server 110 also includes a source deduplication module 116. Source deduplication module 116 is configured to deduplicate data stored in source storage device 140. Source deduplication module 116 is configured to automatically initiate deduplication operations in response to detecting the occurrence of an event. For example, source deduplication module 116 is configured to monitor an amount of available space and store storage. In response to detecting that the amount of available storage space has crossed a predetermined threshold, source deduplication module 116 initiates a deduplication operation. Source deduplication module 116 can also be configured, e.g., by a user, such as an administrator, to perform deduplication operations on a periodic basis. In one embodiment, source deduplication module 116 is configured to initiate a deduplication operation in response to user input.

A deduplication operation involves identifying duplicate portions of data. In order to reduce the amount of storage space required to store data, source deduplication module 116 is configured to store only a single copy of duplicate data, rather than multiple copies. In order to identify duplicate portions of data, source deduplication module 116 is configured to generate a signature, or fingerprint, for a given portion of data. In one embodiment, generating a signature involves calculating a hash value for the portion of data. Various algorithms can be used to calculate the hash value, such as, for example, secure hash algorithm (SHA), message digest (MD), and the like. Source deduplication module 116 is configured to store signatures corresponding to source data 142 in source deduplication metadata 144.

Once source deduplication module 116 has created a signature for a given portion of data, source deduplication module 116 can compare the signature with signatures that have been created by source deduplication module 116 for other portions of data stored in data 142. In response to detecting that the signature for the given portion of data matches a signature for another portion of data stored in data 142, source deduplication module 116 concludes that the given portion of data is a duplicate portion of data to a portion of data already stored in data 142. In response to detecting that the given portion of data is a duplicate, source deduplication module 116 stores a reference to the given portion of data rather than storing the given portion of data itself. The reference can be implemented as a pointer, and uses less storage space than the given portion of data would. In one embodiment, the reference is stored in a location in source data 142, such that when an I/O operation targets the location that stores the reference, the I/O operation is redirected (pointed) to an address where the targeted data is actually stored. In another embodiment, a table is created such that when an I/O operation is received that targets a particular portion of data, the I/O operation is redirected based on information in the table that indicates where the portion of data is stored.

In one embodiment, a given portion of data is referred to as a segment. A segment can also be called a chunk. A segment can refer to any logical portion of data, such as a file or directory. A segment can also refer to any physical portion of data, such as a block.

Configuring source deduplication module 116 to perform deduplication operations involves specifying various aspects of a deduplication schema that will be used by source deduplication module 116 to deduplicate source storage 142. The deduplication schema includes specification of various aspects that are used to perform deduplication operations. For example, a deduplication schema has an associated segment size. The segment size may be either fixed or variable. Source deduplication module 116 is configured to select and/or divide portions of data into the specified segment size. For example, the deduplication schema used by source deduplication module 116 can specify a segment size of 64 kilobytes (KB). Source deduplication module 116 divides data objects in source data 142 into 64 KB segments. For each 64 KB segment, source deduplication module 116 generates a signature. The deduplication schema can also include a hash algorithm that source deduplication module 116 uses to generate signatures for the segments. The deduplication schema can also include a signature length that is to be generated. For example, source deduplication module 116 can generate 4-bit signatures or 8-bit signatures for segments. The deduplication schema can also specify how source deduplication module 116 should handle incomplete segments. For example, the deduplication schema can indicate whether source deduplication module 116 should pad incomplete chunks, and what value should be used for any padding.

The deduplication schema can be configured manually, for example, by a user. In one embodiment, the deduplication schema is automatically generated by deduplication module 116. For example, source deduplication module 116 can select a default value from a list of available values for each aspect specified by the deduplication schema. The deduplication schema can be stored by deduplication module 116 in source deduplication metadata 144. Source deduplication metadata 144 also includes the signatures for the segments of data stored in source data 142. In one embodiment, the signatures are stored in a list. Before storing any new segments of data in source data 142, source deduplication module 116 is configured to generate a signature for the segment and compare that signature with the list of signatures stored in source deduplication metadata 144. If the signature is found in source deduplication metadata 144, an identical segment is already stored in source data 142. Rather than store a duplicate copy of the segment, source deduplication metadata 144 is updated by source deduplication module 116 to reflect that the segment is referred to an additional time. In one embodiment, this involves updating a reference counter that indicates how many times the segment is shared.

As shown, the system of FIG. 1 also includes backup server 120. Backup server 120 is implemented using a computing device such as a personal computer, laptop computer, server, personal digital assistant, cell phone, and the like. Backup server 120 can include one or more mail servers, web servers, file servers, document repositories, database servers, and the like. Backup server 120 can also include one or more applications, not shown, such as word processing programs, email programs, graphic editing programs, database applications, or the like. Backup server 120 is configured to access data, such as backup data 152. Accessing backup data 152 can include performing input/output (I/O) operations such as, for example, writing to and/or reading from, backup data 152. The I/O operations can be performed in response to a request by one or more clients (not shown).

Backup server 120 is configured to perform backup and restore operations. For example, backup server 120 is configured to receive data from source server 110, and store a backup copy of the data in backup storage device 150. Backup server 120 is also configured to receive restore requests from source server 110, and to restore data from backup storage device 150 to source storage device 140.

Backup server 120 includes backup module 122. Backup module 122 is configured to interact with B/R module 112. For example, backup module 122 is configured to receive a backup request from B/R module 112. Backup module 122 is also configured to receive data from B/R module 112, and to store the data in backup storage device 150.

As shown, backup server 120 is coupled to source storage device 150. Backup storage device 150 provides persistent data storage, such that data stored on backup storage device 150 will remain stored even after the storage device is powered off. Backup storage device 150 can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Backup storage device 150 can also be a virtual or logical storage device that is implemented on such physical storage devices and/or storage systems. For example, backup storage device 140 can be a logical volume that is implemented on a RAID storage system. Additionally, backup storage device 150 can include one or more storage devices. Backup storage device 150 can also include one or more types of storage media, including solid state media (e.g., flash drives), optical media (e.g., CDs and DVDs), and magnetic media (e.g., hard disks or magnetic tape). In some embodiments, backup storage device 150 can be implemented using cloud storage, in which the storage device is a logical storage device to which physical storage device(s) are allocated on an as-needed and/or as-contracted basis.

As shown, backup storage device 150 includes backup data 152 and backup deduplication metadata 154. Backup data 152 can include data that is accessible by backup server 120, such as application data, word processing files, media files, database files, and the like. Metadata can also be included within backup data 152, such as file system information identifying which blocks of backup data 152 store what data, access times, permissions, and the like. Backup data 152 can also include references to data, such as pointers. Backup deduplication metadata 154 can include information identifying deduplicated data segments. In one embodiment, backup deduplication metadata 154 can be implemented as a database. Backup deduplication metadata 154 includes a list of signatures of data segments stored in backup data 154, as well as reference counts indicating how many times each segment is shared, e.g., how many files include copies of a given segment.

Backup server 120 also includes a backup deduplication module 126. Backup deduplication module 126 is configured to deduplicate data stored in backup storage 150, in particular, backup data 152. Backup deduplication module 126 is configured to generate signatures for segments of data that are to be written to backup data 152 and to determine, using the signatures whether the segments of data are already stored in backup data 152. If a given segment is already stored in backup data 152, rather than store an additional copy of the given segment, backup deduplication module 126 is configured to update backup deduplication metadata 154 to indicate that the given segment is being referred to again. In order to identify duplicate segments, backup deduplication module 126 is configured to compare a signature for a given segment that is to be written with signatures stored in backup deduplication metadata 154, where the signatures correspond to segments of data stored in backup data 152.

Backup server 120 also includes a restore module 124. Restore module 124 is configured to interact with B/R module 112 to perform restore operations. For example, restore module 124 is configured to receive a restore request from B/R module 112. In one embodiment, the restore request includes information identifying data that is to be restored. Restore module 124 is configured to restore the data from backup data 152 to source storage 140, in particular to source data 142. In one embodiment, restoring data from backup storage 150 to source storage 142 involves rehydrating the data prior to transmitting the data from backup data 152 to source data 142. In one embodiment, backup storage device 152 is not deduplicated. In this embodiment, restore module 142 calculates signatures for data to be restored in response to receiving the restore request. Restore module 142 can then segregate the data based upon the signatures, as discussed in conjunction with FIG. 5.

Restore module 124 is also configured to generate one or more restore data sets. For example, in response to receiving a restore request that specifies data to be restored, restore module 124 can be configured to segregate the data that is to be restored into several smaller restore data sets. Restore module 124 is configured segregate the data to be restored into restore data sets based, for example, on commonality, or duplicate segments. For example, if a given segment is duplicated several times, e.g., is included in several files that are being restored, restore module 124 includes all duplicate copies (or as many of the duplicates as is possible, depending on the restore data set size) in a single restore data set. By attempting to include as many duplicate segments as possible in a single restore data set, restore module 124 is able to improve the compression ratio that can be realized by source deduplication module 116 when the restore data set is restored to source data 142.

Restore module 124 is configured to transmit the restore data sets one by one from backup data 152, via backup server 120, to source data 142, via source server 110. Between transmitting each of the restore data sets, restore module 124 is configured trigger source deduplication module 116 to perform a deduplication operation. In generating the restore data sets, restore module 124 is configured to sort the data that is to be restored. Restore module 124 is configured to sort the data based on signatures used for deduplicating the data.

As discussed in greater detail with regard to the following figures, the system of FIG. 1 is configured to prevent restore operations from failing due to inadequate available space in source storage for data that is being restored from backup storage. Consider the following example of operations that the system of FIG. 1 can perform. In this example, B/R module 112 initiates a restore operation and specifies that files totaling 1.5 GB of data to be restored. However, source data 142 only has 1 GB available space, in this example. Restoring the entire 1.5G would overflow source data 142 and cause the restore operation to fail. Instead, restore module 124 divides the 1.5 GB of data into three restore data sets of 500 MB each. Prior to generating the restore data sets, restore module 124 sorts the data based on signature information, e.g., as stored in backup deduplication metadata 154, such the each of the three restore data sets will include as many duplicate segments as possible. Restore module 124 then restores the first restore data set from backup data 152 to source data 142. Subsequent to restoring the restore data set, source data 142 has 500 MB of available space (1 GB initially free minus 500 MB added from the restore data set). Next, restore module 124 triggers source deduplication module 116 to perform a deduplication operation on source data 142. Assuming a deduplication compression ratio of 2:1, the 500 MB restore data set compresses from 500 MB to 250 GB as a result of being deduplicated, leaving source storage 142 with 750 MB of available space. Restore module 142 then restores the second 500 MB restore data set. This leaves source data 142 with 250 MB of available storage space. Again, restore module 142 triggers source deduplication module 116 to perform a deduplication operation on source data 142. If the same 2:1 deduplication compression ratio is used, source data 142 is left with 500 MB of available space. Restore module 142 then restores the third restore data set from backup data 152 to source data 142. At this point, source data 142 has no available space remaining. However, once restore module 142 triggers deduplication module 116 to perform a deduplication operation on source data 142, source data 142 is left with 250 MB of available space. By performing the restore operation in stages, and deduplicating source data 142 in between each data transfer, the entire 1.5 GB of data can be restored without the restore operation failing.

Figure 2:
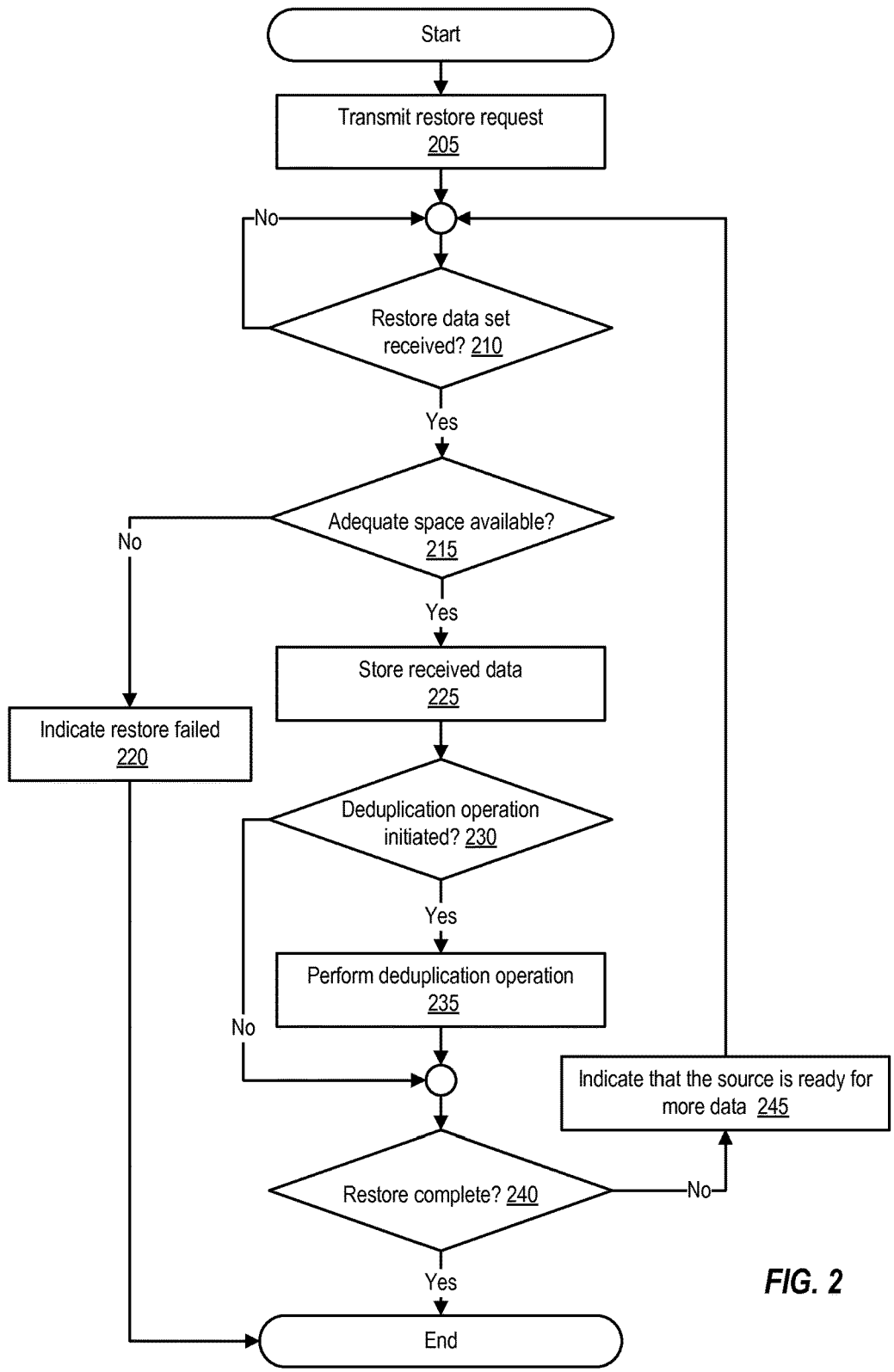
FIG. 2 is a flowchart showing a method of performing a restore operation in a deduplication environment, according to one embodiment.

FIG. 2 shows a method of performing a restore operation in a deduplication environment. The operations in FIG. 2 can be performed, for example, by a B/R module, such as B/R module 112 of FIG. 1.

The method begins at 205, with the B/R module transmitting a restore request to a restore module at a backup server, such as restore module 124 of backup server 120 of FIG. 1. In one embodiment, the restore request includes information identifying data that is to be restored. For example, the restore request can include information that identifies one or more files, folders, volumes, or other logical or physical organization of data, such as one or more file names, block addresses, and the like. The restore request can also include a target location to which the data is to be restored, such as one or more file names, directory names, and/or physical addresses on a source storage device, such as source storage device 140 of FIG. 1. The B/R module can also transmit information to the restore module regarding a source server, such as source server 110 of FIG. 1, such as space available on the source server (or in the source storage device), a deduplication method used by the source, including, for example, segment size and signature generation algorithm, and the like.

After transmitting the restore request, the B/R module waits, at 210, to receive data from the backup server. In response to receiving a restore data set from the backup server, the B/R module determines, at 215, whether the source storage device has enough storage space available to store the received data. In one embodiment, this involves the B/R module determining the size of the received restore data set, for example, by using metadata associated with the restore data set, and comparing the size of the restore data set with a measured value of available space in the source storage device. If the B/R module determines that there is not sufficient space available to write the entire restore data set to the source storage device, the restore operation fails and the B/R module generates, at 220, an indication that the restore operation has failed.

If the source storage device has sufficient free space to store the received data, the source server stores, at 225, the received data in the source storage device. At 230, a source deduplication module, such as source deduplication module 116 of FIG. 1, determines whether to perform a deduplication operation. In one embodiment, the source deduplication module receives an indication such as a message that includes, for example, a command or instruction from the restore module indicating that the source deduplication module should perform a deduplication operation. The source deduplication module can also perform a deduplication operation in response to receiving the restore data, or in response to determining that a specified threshold regarding the amount of data stored in the source storage device is met or exceeded, or the like. For example, in response to the source deduplication module determining that the amount of available storage space in the source storage device has fallen below a specified value, or percentage of total capacity, the source deduplication module can initiate a deduplication operation.

At 235 the source deduplication module performs a deduplication operation. In one embodiment, the deduplication operation is an incremental deduplication operation. An incremental deduplication operation only deduplicates data that is received since a previous deduplication operation was performed. This involves comparing metadata associated with the received data indicating when the received data was received with metadata that indicates when the last deduplication operation was performed. If the comparison indicates that the received data was received after the previous deduplication operation was performed, the received data is included in the deduplication operation. Otherwise, the received data is excluded. The deduplication operation involves generating a signature for each received segment of data and comparing the signature with a list of signatures stored in source deduplication metadata, such as source deduplication metadata 144. If a signature for a segment of the received data matches, the segment is already stored in the source storage device and the source deduplication module does not store the segment. Instead, the source deduplication module stores a reference to the segment. In one embodiment, a full deduplication operation is executed instead of an incremental deduplication operation.

The B/R module determines, at 240, whether the restore is complete. This can involve determining whether all data specified in the restore request has been received. In one embodiment, information included with the received data, such as an indication of how many data sets are to be provided and which data sets have been provided, can be used by the B/R module to determine whether all data has been received. In another embodiment, the B/R module compares metadata identifying the received data, such as file names, with the information included in the restore request that identified data to be restored.

If the B/R module determines that all data included in the restore operation has been received, the restore operation is complete. Otherwise, the method returns to 210 to wait for additional data. In one embodiment, the B/R module generates, at 245, an indication that the source is ready for more data. For example, such an indication can be an message sent to the backup server that the deduplication operation is complete, a calculation of available storage space, a flag indicating that all received data has been stored, or the like. The B/R module can transmit the indication to the backup server, or the backup server can check, e.g., periodically poll, the backup server to receive the indication.

Figure 3:
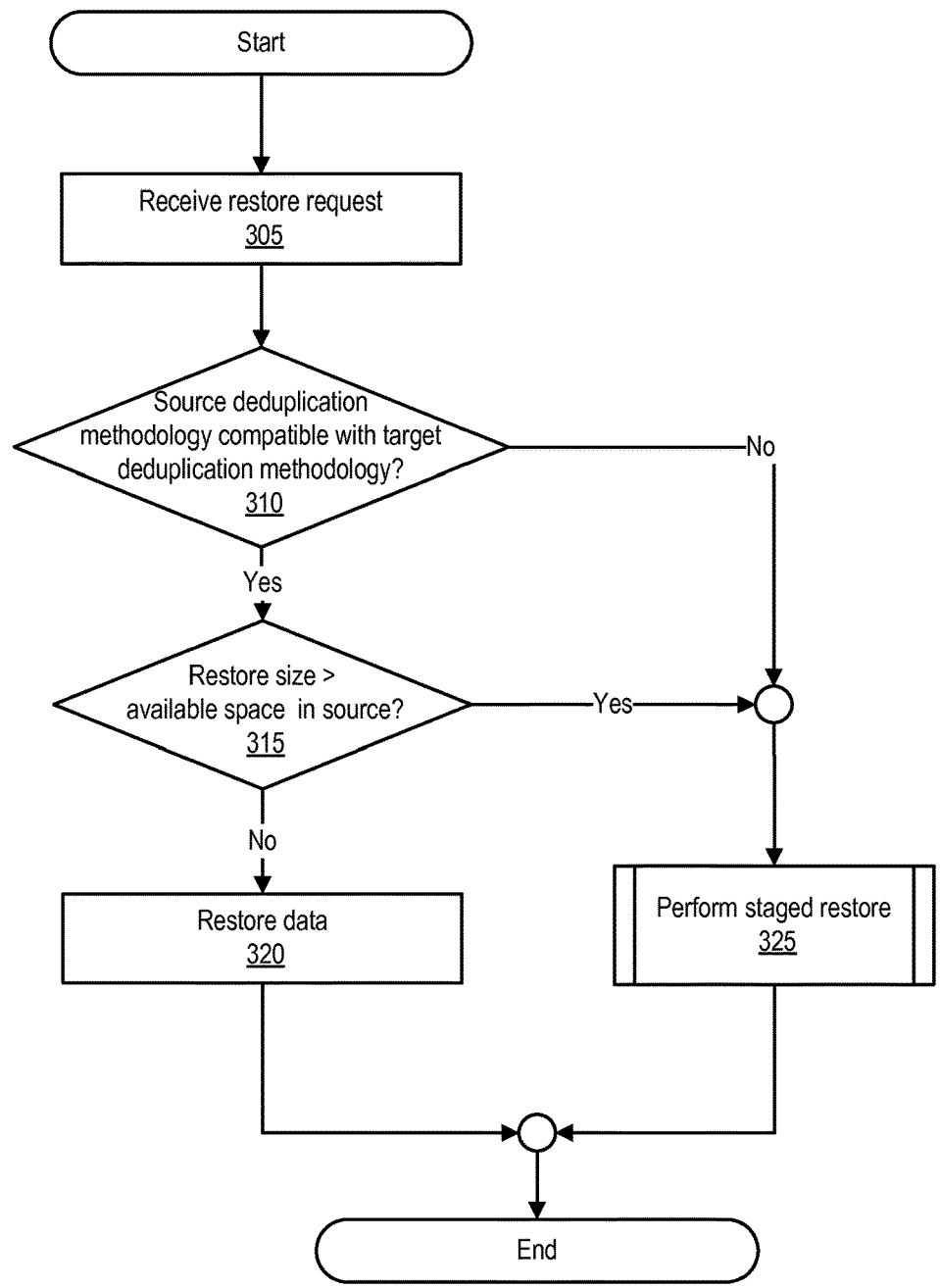
FIG. 3 is a flowchart showing additional details of a method of performing a restore operation in a deduplication environment, according to one embodiment.

FIG. 3 shows a method of performing a restore operation in a deduplication environment. The operations in FIG. 3 can be performed, for example, by a restore module, such as restore module 124 of FIG. 1.

At 305, the restore module receives a restore request. In one embodiment, the restore request is received from a B/R module, such as B/R module 112, on a source server, such as source server 110 of FIG. 1. In one embodiment, the restore request includes information identifying data to be restored from a backup storage device, such as backup storage device 150, to the source server. The information can include, for example, one or more logical identifiers, such as file names, and/or physical identifiers, such as block addresses.

At 310, the restore module determines whether the backup server uses a deduplication method that is identical to, or compatible with, a deduplication method used by the source server. The restore module can access information, for example information received with a restore request, to determine the type of deduplication method used by the source. The restore module can also send a message to the source that includes a query requesting information identifying the type of deduplication used by the source. The information that identifies the deduplication method can include, for example, segment size, method of segmentation, signature type, signature size, information regarding the signature generation process (e.g., hash algorithm), and the like.

In response to the restore module receiving information indicating the type of deduplication used by the source server, the restore module determines whether the deduplication method used by the source is compatible with a deduplication method used by the backup. In one embodiment, the backup server does not use deduplication, so the restore module concludes that the source deduplication method is not compatible. In another embodiment, the restore module is unable to determine the deduplication method used by the source. If the restore module is unable to determine the type of deduplication used by the source server, the restore module determines that the source deduplication method is not compatible with the backup deduplication method (if any).

If the backup server does utilize deduplication, the restore module is configured to compare the information regarding the deduplication methodology used by the source server with information regarding the deduplication methodology used by the backup server. In one embodiment, the restore module queries a backup deduplication module, such as backup deduplication module 126 of FIG. 1, to determine the deduplication method used by the backup server. The restore module then compares information regarding the source deduplication method with information regarding the backup deduplication method. For example, the restore module can compare the signature type used by the source (e.g., MD2) with the signature type used by the backup server (e.g., SHA-2).

In response to detecting that the deduplication methodologies are not compatible, e.g., in response to detecting that the signature type, or any other deduplication parameter of the source server deduplication methodology does not match the corresponding parameter of the backup server deduplication methodology, the restore module determines that the source's deduplication method is incompatible with the backup server, and performs a staged restore operation, at 325. A method of performing a staged restore operation is described in greater detail in conjunction with FIGS. 4 and 5.

In response to the restore module determining that source deduplication method is not incompatible with the backup deduplication method, the restore module determines, at 315, whether the source storage device has enough space to store the data that is to be restored, as indicated by the restore request. In one embodiment, the restore module calculates the size of the data to be restored. The restore module detects the amount of available space on the source. The restore module can query the source server and receive a message that indicates the amount of available space available to the source server, or the source server can provide information indicating the amount of space available to the source server automatically, e.g., along with the restore request. In one embodiment, the restore module accesses information on the source itself, e.g., accesses metadata maintained by the source that indicates how much space is available on the storage device(s) at the source.

In response to the restore module determining that the source does not have enough space to store all the data that is to be restored in response to the restore request, the restore module performs a staged restore operation, at 325. Otherwise, the restore module restores the data to the source, at 320. In one embodiment, the restore module performs a staged restore without irrespective of any other considerations, making 310 and 315 optional.

Figure 4:
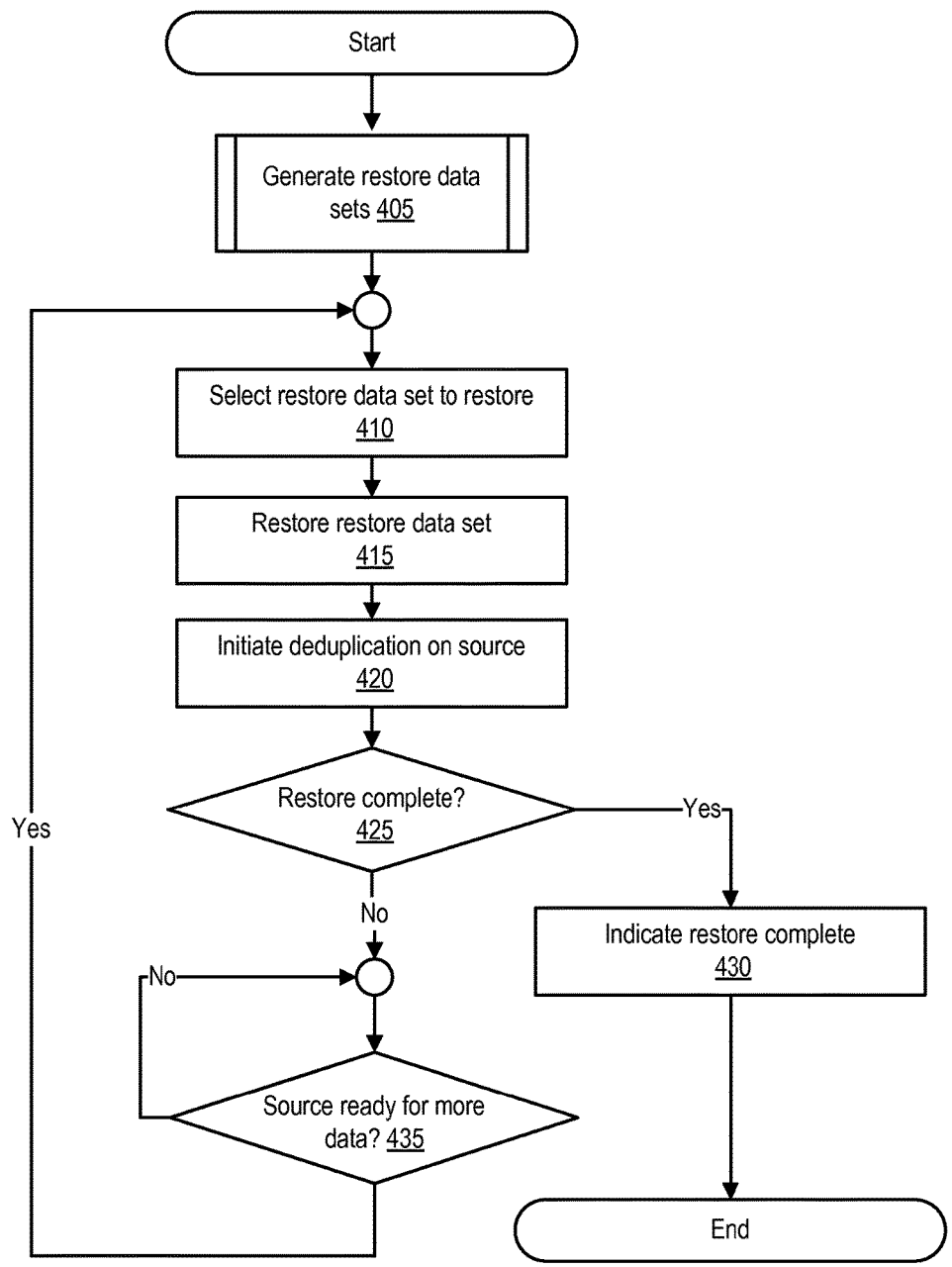
FIG. 4 is a flowchart showing additional details of a method of performing a restore operation in a deduplication environment, according to one embodiment.

FIG. 4 shows a method of performing a staged restore operation in a deduplication environment. The operations in FIG. 4 can be performed, for example, by a restore module, such as restore module 124 of FIG. 1.

At 405, the restore module generates one or more restore data sets. Generating restore data sets, as described in greater detail in connection with FIG. 5, generally includes dividing a set of data that is to be restored (a restore data set) into several smaller restore data sets that are individually restored in separate operations. The restore module selects, at 410, a first restore data set to restore. The restore module can linearly traverse a list of restore data sets and select a first of several sets of restore data sets to be restored, or can select a restore data set based on detecting some criteria, such as a priority, associated with one of the restore data sets.

At 415, the restore module restores the selected restore data set. Restoring a restore data set involves, for example, copying the data set from backup storage, such as backup storage device 150 of FIG. 1, to a specified storage target, such as source storage device 140 of FIG. 1. Restoring the data can also include, in an embodiment in which the backup storage is deduplicated, rehydration of the data. The restore module can also perform compression and encryption/decryption operations in association with, or as part of, a restore operation.

At 420, the restore module initiates, or triggers, a deduplication operation on the source server. In one embodiment, the restore module transmits a command to a deduplication module on the source server, such as source deduplication module 116 of FIG. 1. In response to receiving the command, the source deduplication module initiates a deduplication operation. The deduplication operation can be a full deduplication operation or an incremental deduplication operation. In the case of an incremental deduplication operation, the deduplication operation involves deduplicating the data that was just restored, e.g., only data received from the restore module since a previous deduplication operation was performed by the source deduplication module. Deduplicating the data can involve deduplicating the data with respect to itself and/or with respect to data already stored in source storage, such as source data 142.

Subsequent to triggering a deduplication operation on the source, the restore module detects, at 425, whether the restore operation is complete. This can involve detecting whether all data identified by the restore request has been restored and/or whether an indication has been received from the source that the restore operation is complete or has failed. In response to detecting that the restore operation is complete, the restore module generates, at 430, an indication that all data has been restored. In one embodiment, the restore module transmits a message to the source indicating that the restore operation is complete.

In response to the restore module determining, at 425, that the restore operation is not complete, the restore module determines, at 435, whether the source server is ready for more data. In one embodiment, this involves the restore module waiting until a signal is received from the source server indicating that the source server is ready for more data, e.g., that the previous restore data set has been restored and deduplicated by the source server. In another embodiment, the restore module can monitor the amount of storage space available to the source server. Based on detecting that the amount of available space is greater than a pre-specified threshold value, the restore module can determine that the source is ready for more data. The restore module can determine that the source is ready for more data based on a time elapsed since the previous data was sent. In response to the restore module detecting that the source is ready for more data, the method returns to 410 and the restore module selects another data set to restore.

Figure 5:
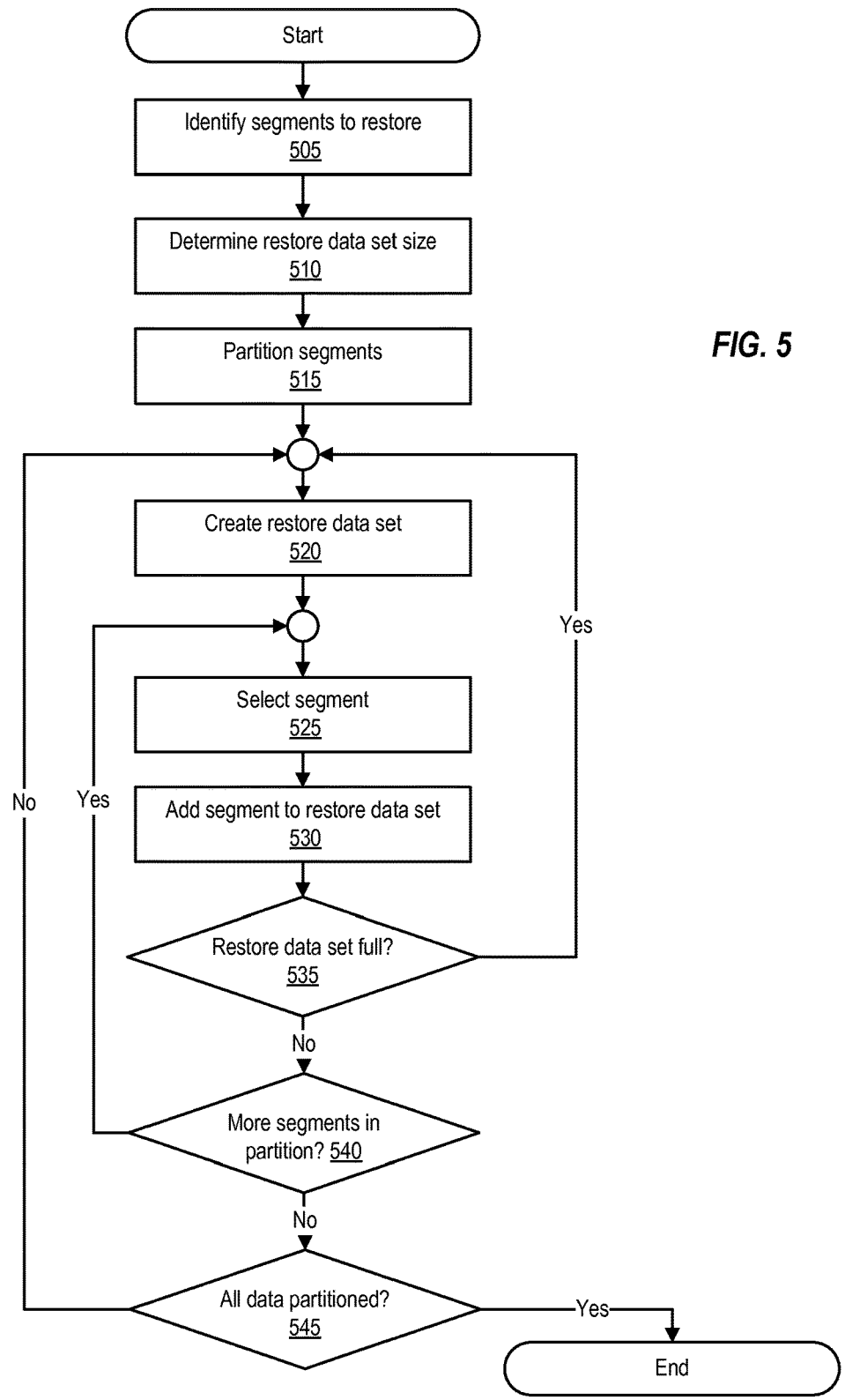
FIG. 5 is a flowchart showing additional details of a method of performing a restore operation in a deduplication environment, according to one embodiment.

FIG. 5 shows additional operations associated with generating restore data sets. In one embodiment, the operations are performed by a restore module, such as restore module 124 of FIG. 1.

At 505, the restore module identifies which segments are included in a restore operation. In one embodiment, a restore request that includes information identifying data to be restored is received from a B/R module, such as B/R module 112 of FIG. 1. The restore request can include information that identifies one or more logical groupings of data, such as files, or physical groupings of data, such as blocks. The restore module translates the information received from the B/R module into segment identifiers that correspond to the segments stored by the backup server. For instance, if the restore request specifies four file names, the four files are to be restored. The restore module identifies which segments are included in the four files. In one embodiment, the restore module generates a list that includes segment identifiers for the segments to be restored.

The restore module determines a size to be used for the restore data set, at 510. The restore module can base the restore data set size on, for example, an amount of available space in the storage to which the data is to be restored. In one embodiment, the restore module specifies a restore data set size such that all data in a restore data set of the specified size will fit in a source storage device, such as source storage device 140 of FIG. 1, without being deduplicated.

In one embodiment, determining the size to be used for a restore data set is based on the amount of data being restored. The restore module can automatically select a restore data set size. In one embodiment, the restore data set size is specified by a user, such as a system administrator. A specified restore data set size can be included in the restore request. In one embodiment, determining a restore data set size is based on the amount of duplicate data to be restored, and is performed after partitioning the segments. In this embodiment, the restore data set size is selected in order to maximize the amount of duplicate data, e.g., number of duplicate segments, that is included in one or more restore data sets.

At 515, the restore module partitions, or segregates, the segments into several groups, which form the basis for several restore data sets. In one embodiment, partitioning the data includes sorting a list of segments according to the signatures. This has the effect of grouping duplicate segments together in the list. That is, if several duplicate segments exist in the data being restored, sorting the list results in the signatures for the segments being located sequentially in the list without any intervening signatures, since the signatures for the duplicate segments are identical. In one embodiment, partitioning is performed by selecting duplicate segments and generating separate lists that include only duplicate segments, or by any other means of grouping duplicate segments, or the information associated therewith, such as the segments' signatures. In one embodiment, partitioning the data to be restored involves comparing a signature associated with the segment with other signatures stored in lists of signatures that correspond to segments stored in backup storage. If the signature is identical to another signature in the lists, then duplicate copies of the segment exist. For example, if a first file has three segments, a second file has three segments, and a third file has three segments and a first signature is found in the first file associated with one of the segments of the first file and associated with one of the segments in the third file, then the first file and the third file each contain an identical copy of the segment associated with the signature. In this case, the restore module adds the duplicate segments to the partition. Doing so will cause the duplicate segments to be restored in the same data set. In one embodiment, the restore module adds segments associated with the duplicate to the set as well. For example, the restore module may add the other two segments of the third file to the set as well.

At 520, the restore module creates a restore data set. In one embodiment, this involves generating a list that includes information identifying the segments to be restored. Initially the restore data set is empty, or the list that identifies segments to be included in the restore data set is blank.

At 525, the restore module selects a segment to be included in the restore data set. In one embodiment, this involves translating from a logical identifier supplied in the restore request to a physical identifier, such as an address or extent of where the segment begins and is located. The restore module selects a first segment that is to be added to the set. In one embodiment, the restore module traverses a partition of segments in order, selecting the first segment first, the second segment second, and so on until the end of the list is reached or the restore data set is full.

At 530, the restore module adds the segment to the restore data set. In one embodiment, this involves adding a signature and/or address and other identifying information for the segment to the list that defines which segments will be restored with the restore data set. In one embodiment, the restore module adds a file to the set. For example, if a segment is to be added, the restore module is configured add the file (each segment associated with the file) that includes the segment to the restore data set.

The restore module determines, at 535, whether the restore data set is full. For example, if the restore module specified a maximum size of 500 MB for the restore data set, the restore module calculates the total size of the segments that have been added to the restore data set and compares the calculated size with the maximum size. If the restore data set is full, e.g., cannot include additional segments without exceeding the specified maximum size, the method returns to 520, and the restore module creates another restore data set.

At 540, the restore module detects whether there are more segments in the partition. If so, the method returns to 525 and the restore module selects another segment to be included in the restore data set. Otherwise, at 545, the restore module detects whether all data has been added to the restore data sets. If not, the method returns to 520 and the restore module generates a new restore data set.

FIG. 6A shows an example of metadata that can be maintained concerning data stored in backup storage, such as backup storage 150 of FIG. 1 and stored in backup deduplication metadata, such as backup deduplication metadata 154 of FIG. 1. In one embodiment, the metadata is generated by a backup deduplication module, such as backup deduplication module 126 of FIG. 1. As shown in FIG. 6A, the metadata includes four columns. The first column includes a logical identifier. In one embodiment, a logical identifier can be implemented as a file name. The second column includes a segment identifier. The segment identifier can be implemented as an arbitrary number assigned by the deduplication module to a given segment of data. The third column is a signature column. In the signature column, a signature for each segment of data is found. In one embodiment, the backup deduplication module has calculated a signature for each segment using a hash function. The fourth column includes an address. In one embodiment, this is a physical address where the segment is located in backup storage. As can be seen in FIG. 6A, several duplicate segments exist. For example, segment 1 has an identical signature to segments 8 and 11. Since the backup storage is deduplicated only one copy of the segment is actually stored, as evidenced by the fact that segments 1, 8, and 11 all have the same address. Segments 1, 8, and 11 are associated with different logical identifiers. If a restore request specified that segments 1-4 should be restored, one order of the restoration might naturally take would be first restore F1 then F2 then F3 then F4. However, in order to capture duplicates within one restore data set, the segments are sorted as shown in FIG. 6B.

FIG. 6B includes a set column. The set column includes an identifier for each of four restore data sets. In this example, a data set size is three segments and duplicate segments are coalesced into a single data set.

FIG. 6C depicts another method of generating data sets. In FIG. 6C, the data sets are based on files. In this example, files F1, F4, and F6 each have an identical segment. Therefore, all data associated with files F1, F4, and F6 are coalesced into a restore data set. If not all data associated with the files having duplicate segments can be included in a single data set, e.g., due to size limitations on the data set size, the restore data set can be split into multiple restore data sets.

Figure 7:
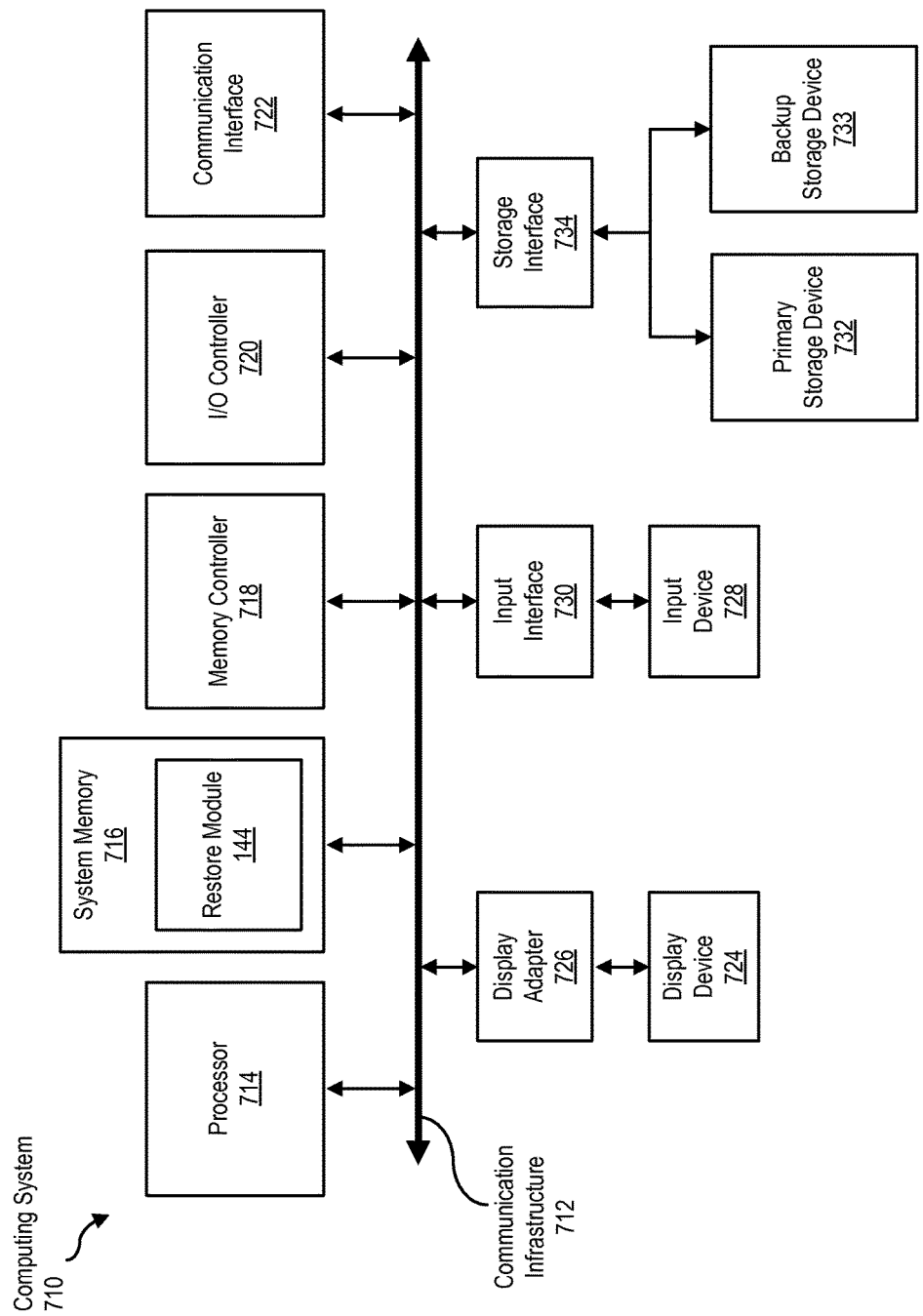
FIG. 7 is a block diagram of a computing device, illustrating how a restore module can be implemented in software, according to one embodiment.

FIG. 7 is a block diagram of a computing device, illustrating how a restore module can be implemented in software, as described above. Computing system 710 broadly represents any single or multi-processor computing device or system capable of executing computer-readable instructions. Examples of computing system 710 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 710 may include at least one processor 714 and a system memory 716. By executing the software that implements a restore module 144, computing system 710 becomes a special purpose computing device that is configured to complete staged restore operations in a deduplication environment, in the manner described above.

Processor 714 generally represents any type or form of processing unit capable of processing data or interpreting and executing instructions. In certain embodiments, processor 714 may receive instructions from a software application or module. These instructions may cause processor 714 to perform the functions of one or more of the embodiments described and/or illustrated herein. For example, processor 714 may perform and/or be a means for performing the operations described herein. Processor 714 may also perform and/or be a means for performing any other operations, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, program instructions executable to implement a restore module (e.g., as shown in FIG. 1) may be loaded into system memory 716.

In certain embodiments, computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the operations or features described and/or illustrated herein.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 7100, and storage interface 7104.

Communication interface 722 broadly represents any type or form of communication device or adapter capable of facilitating communication between computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer) for display on display device 724.

As illustrated in FIG. 7, computing system 710 may also include at least one input device 728 coupled to communication infrastructure 712 via an input interface 730. Input device 728 generally represents any type or form of input device capable of providing input, either computer or human generated, to computing system 710. Examples of input device 728 include, without limitation, a keyboard, a pointing device, a speech recognition device, or any other input device.

As illustrated in FIG. 7, computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. A storage device like primary storage device 732 can store information such as full backup images, incremental backup images, and/or backup metadata.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7.

Computing system 710 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 710 for storage in memory via a network such as the Internet or upon a carrier medium.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the embodiments described and/or illustrated herein. Additionally or alternatively, one or more of the embodiments described and/or illustrated herein may be implemented in firmware and/or hardware. For example, computing system 710 may be configured as an application specific integrated circuit (ASIC) adapted to implement one or more of the embodiments disclosed herein.

Figure 8:
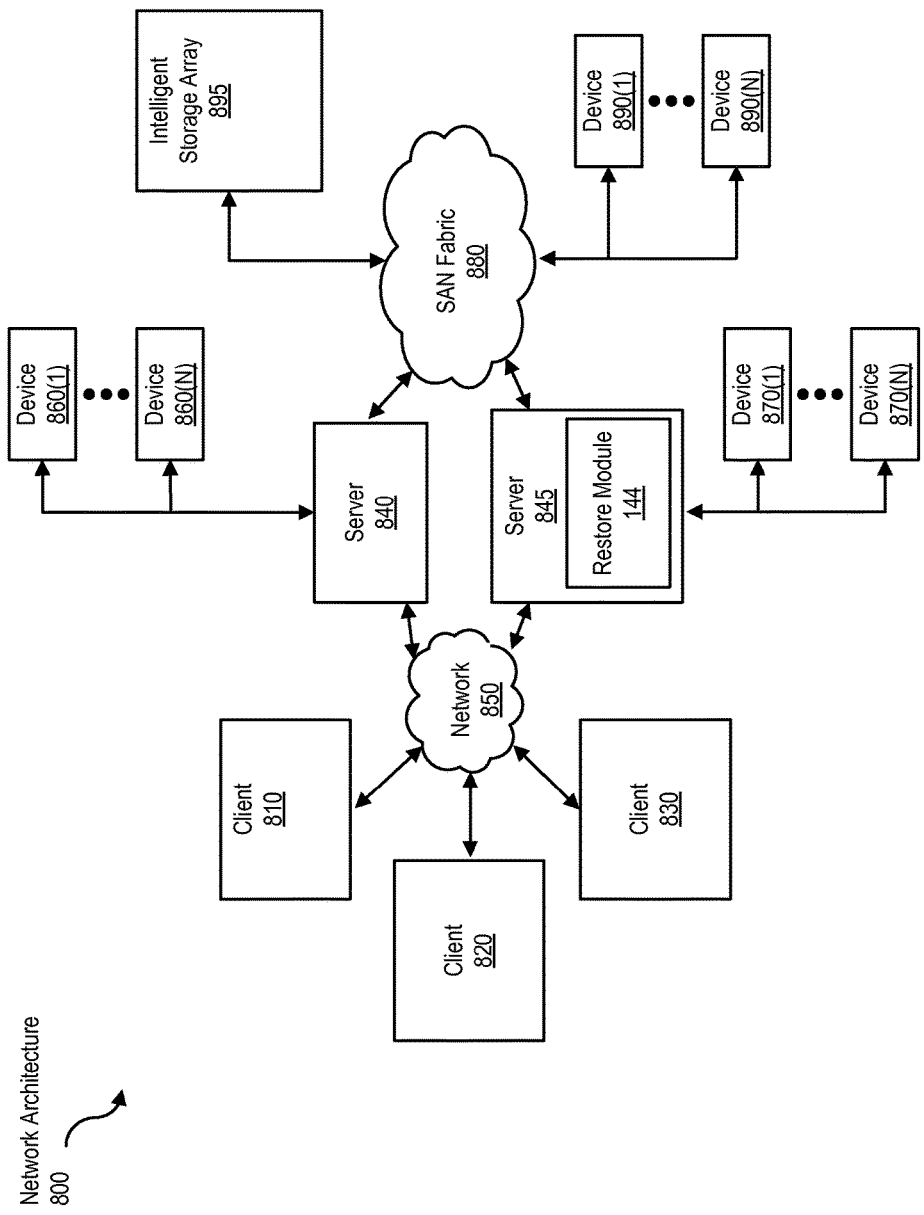
FIG. 8 is a block diagram of a networked system, illustrating how various computing devices can communicate via a network, according to one embodiment.

FIG. 8 is a block diagram of a network architecture 800 in which client systems 810, 820, and 830 and servers 840 and 845 may be coupled to a network 850. Client systems 810, 820, and 830 generally represent any type or form of computing device or system, such as computing system 710 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, one or more of client systems 810, 820, and/or 830 may include a restore module 144 as shown in FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as Network File System (NFS), Server Message Block (SMB), or Common Internet File System (CIFS). Such storage devices can store backup information and storage configuration information, as described above.

Servers 840 and 845 may also be connected to a storage area network (SAN) fabric 880. SAN fabric 880 generally represents any type or form of computer network or architecture capable of facilitating communication between multiple storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 840, server 845, storage devices 840(1)-(N), storage devices 870(1)-(N), storage devices 890(1)-(N), intelligent storage array 895, or any combination thereof. All or a portion of one or more of the embodiments disclosed herein may also be encoded as a computer program, stored in server 840, run by server 845, and distributed to client systems 810, 820, and 830 over network 850.

In some examples, all or a portion of one of the systems in FIGS. 1, 7, and 8 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a restore module may transform the behavior of a backup system such that restore operations can be completed in a deduplication environment.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving, at a backup computing system, a backup copy of data from a source computing system;
deduplicating the backup copy at the backup computing system, wherein
the backup copy is deduplicated at the backup computing system by using a first deduplication methodology that is not recognized by the source computing system;
after the backup copy has been deduplicated by the backup computing system, receiving, at the backup computing system, a restore request from the source computing system, wherein
the restore request requires restoration of an amount of data that is greater than an amount of storage that is available on the source computing system;
in response to receiving the restore request, rehydrating the backup copy to create a rehydrated backup copy, wherein
the rehydrated backup copy is created by the backup computing system, and
the rehydrated backup copy comprises a set of data objects;
determining an amount of available memory space on the source computing system for storing data;
transmitting a first portion of the rehydrated backup copy to the source computing system, wherein the transmitting comprises specifying a size of the first portion of the rehydrated backup copy based on the amount of available memory space on the source computing system, the first portion of the rehydrated backup copy is less than all of the rehydrated backup copy, the first portion of the rehydrated backup copy comprises some, but not all, of the data requested via the restore request, and the first portion of the rehydrated backup copy comprises an amount of data that does not exceed the amount of storage that is available on the source computing device; and after the source computing system deduplicates the first portion of the rehydrated backup copy using a second deduplication methodology, transmitting a second portion of the rehydrated backup copy to the source computing system, wherein the first portion of the rehydrated backup copy is transmitted before the backup computing system transmits the second portion of the rehydrated backup copy, a revised amount of available storage indicates an amount of storage that is available on the source computing device after the first portion of the rehydrated backup copy has been dedpulicated by the source computing device by using the second deduplication methodology, the second deduplication methodology is not recognized by the backup computing system, the second portion of the rehydrated backup copy comprises some, but not all, of the data requested via the restore request, the second portion of the rehydrated backup copy comprises an amount of data that does not exceed the revised amount of available storage on the source computing device, and the first portion of the rehydrated backup copy and the second portion of the rehydrated backup copy comprise different data.

2. The method of claim 1, wherein the method further comprises identifying a plurality of duplicate data objects in the set of data objects of the rehydrated backup copy, and grouping the plurality of duplicate data objects into the first portion.

3. The method of claim 2, wherein the identifying comprises an act of sorting signatures associated with the set of data objects of the rehydrated backup copy, and each of the data objects in the set comprises a data segment.

4. The method of claim 3, wherein a size of the first portion of the rehydrated backup copy is based upon a size of the plurality of duplicate data objects.

5. The method of claim 1, wherein the first portion of the rehydrated backup copy is created before the backup computing system creates the second portion of the rehydrated backup copy.

6. The method of claim 1, further comprising:

selecting a first data object to be included in the first portion of the rehydrated backup copy based on determining that the first data object comprises a first data segment, wherein the first data segment is a duplicate of a second data segment, and the second data segment comprised in another data object included in the first portion of the rehydrated backup copy.

7. A non-transitory computer readable storage medium storing program instructions executable to perform a method comprising:

receiving, at a backup computing system, a backup copy of data from a source computing system;

deduplicating the backup copy at the backup computing system, wherein the backup copy is deduplicated at the backup computing system by using a first deduplication methodology that is not recognized by the source computing system;

after the backup copy has been deduplicated by the backup computing system, receive receiving, at the backup computing system, a restore request from the source computing system, wherein the restore request requires restoration of an amount of data that is greater than an amount of storage that is available on the source computing system;

in response to receiving the restore request, rehydrating the backup copy to create a rehydrated backup copy, wherein the rehydrated backup copy is created by the backup computing system, and the rehydrated backup copy comprises a set of data objects copied from a memory of the backup computing system;

determining an amount of available memory space on the source computing system for storing data;

transmitting a first portion of the rehydrated backup copy to the source computing system, wherein the transmitting comprises specifying a size of the first portion of the rehydrated backup copy based on the amount of available memory space on the source computing system, the first portion of the rehydrated backup copy is less than all of the rehydrated backup copy, the first portion of the rehydrated backup copy comprises some, but not all, of the data requested via the restore request, and the first portion of the rehydrated backup copy comprises an amount of data that does not exceed the amount of storage that is available on the source computing device; and after the source computing system deduplicates the first portion of the rehydrated backup copy using a second deduplication methodology, transmitting a second portion of the rehydrated backup copy to the source computing system, wherein the first portion of the rehydrated backup copy is transmitted before the backup computing system transmits the second portion of the rehydrated backup copy, a revised amount of available storage indicates an amount of available storage on the source computing device after the first portion of the rehydrated backup copy has been deduplicated by the source computing device by using the second deduplication methodology, the second deduplication methodology is not recognized by the backup computing system, the second portion of the rehydrated backup copy comprises some, but not all, of the data requested via the restore request, the second portion of the rehydrated backup copy comprises an amount of data that does not exceed the revised amount of available storage on the source computing device, and the first portion of the rehydrated backup copy and second portion of the rehydrated backup copy comprise different data.

8. The non-transitory computer readable storage medium of claim 7, wherein the method further comprises
identifying a plurality of duplicate data objects in the rehydrated backup copy, and
grouping at least one of the duplicate data objects into the first portion of the rehydrated backup copy.

9. The non-transitory computer readable storage medium of claim 8, wherein
the identifying comprises an act of sorting signatures associated with the set of data objects of the rehydrated backup copy.

10. The non-transitory computer readable storage medium of claim 8, wherein
a size of the first portion of the rehydrated backup copy is based upon a size of the duplicate data objects.

11. The non-transitory computer readable storage medium of claim 7 wherein
the first portion of the rehydrated backup copy is created before the second portion of the rehydrated backup copy is created.

12. The non-transitory computer readable storage medium claim 7, wherein the method further comprises:
selecting a first data object to be included in the first portion of the rehydrated backup copy based on determining that the first data object comprises a first data segment, wherein
the first data segment is a duplicate of a second data segment, and
the second data segment is comprised in another data object included in the first portion of the rehydrated backup copy.

13. A backup computing system comprising:
one or more processors; and
a memory coupled to the one or more processors, wherein the memory stores program instructions executable by the one or more processors to perform a method comprising:
receiving, at a backup computing system, a backup copy of data from a source computing system;
deduplicating the backup copy at the backup computing system, wherein
the backup copy is deduplicated at the backup computing system by using a first deduplication methodology that is not recognized by the source computing system;
after the backup copy has been deduplicated by the backup computing system, receiving, at the backup computing system, a restore request from the source computing system, wherein the restore request requires restoration of an amount of data that is greater than an amount of storage that is available on the source computing system;
in response to receiving the restore request, rehydrating the backup copy to create a rehydrated backup copy, wherein
the rehydrated backup copy is created by the backup computing system, and
the rehydrated backup copy comprises a set of data objects;
determining an amount of available memory space on the source computing system for storing data;
transmitting a first portion of the rehydrated backup copy to the source computing system, wherein
the transmitting comprises specifying a size of the first portion of the rehydrated backup copy based on the amount of available memory space on the source computing system,
the first portion of the rehydrated backup copy is less than all of the rehydrated backup copy,
the first portion of the rehydrated backup copy comprises some, but not all, of the data requested via the restore request, and
the first portion of the rehydrated backup copy comprises an amount of data that does not exceed the amount of storage that is available on the source computing device; and
after the source computing system deduplicates the first portion of the rehydrated backup copy using a second deduplication methodology, transmitting a second portion of the rehydrated backup copy to the source computing system, wherein
the first portion of the rehydrated backup copy is transmitted before the backup computing system transmits the second portion of the rehydrated backup copy,
a revised amount of available storage indicates an amount of available storage on the source computing device after the first portion of the rehydrated backup copy has been deduplicated by the source computing device by using the second deduplication methodology,
the second deduplication methodology is not recognized by the backup computing system,
the second portion of the rehydrated backup copy comprises some, but not all, of the data requested via the restore request,
the second portion of the rehydrated backup copy comprises an amount of data that does not exceed the revised amount of available storage on the source computing device, and
the first portion of the rehydrated backup copy and the second portion of the rehydrated backup copy comprise different data.

14. The system of claim 13, wherein
the rehydrated backup copy comprises a set of data objects; and
the method further comprises identifying a plurality of duplicate data objects in the set of data objects, and
grouping at least one of the duplicate data objects into the first portion of the rehydrated backup copy.

15. The system of claim 14, wherein
the identifying comprises an act of sorting signatures associated with the set of data objects.

16. The system of claim 13, wherein
the first portion of the rehydrated backup copy is rehydrated before the second portion of the rehydrated backup copy is rehydrated.

* * * * *